May 11, 1965 J. S. HARRIS ETAL 3,182,859
HOT MIX HANDLING PLANT
Filed March 22, 1963 4 Sheets-Sheet 1

INVENTORS
JAMES STANLEY HARRIS
ARTHUR J. JOHNSON
BY Lothrop & West
ATTORNEYS

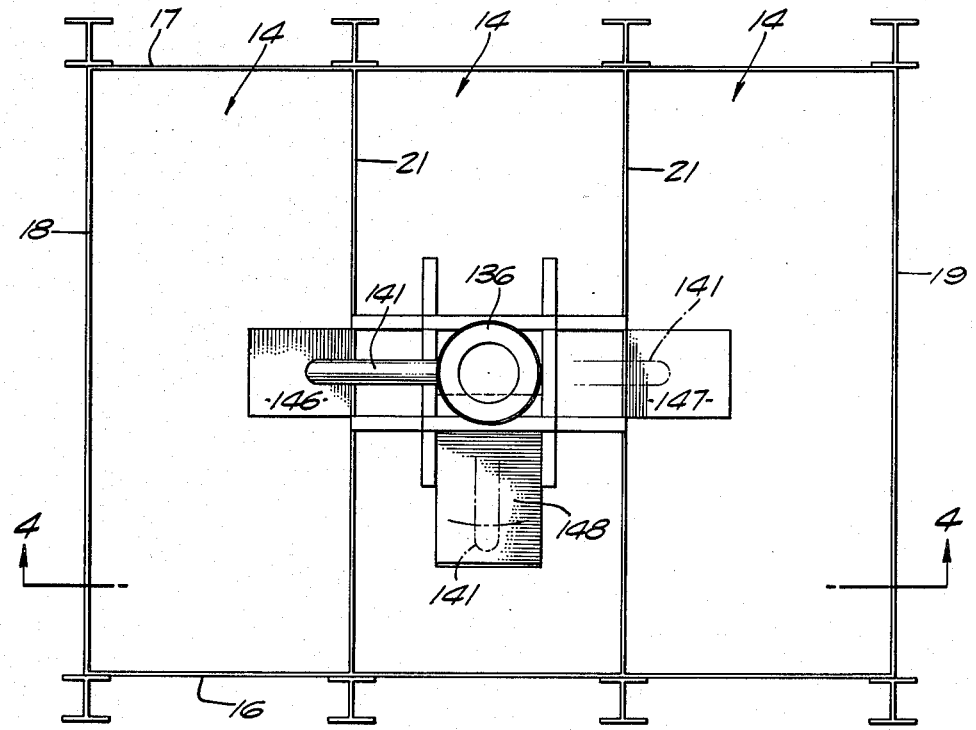
FIG. 3.
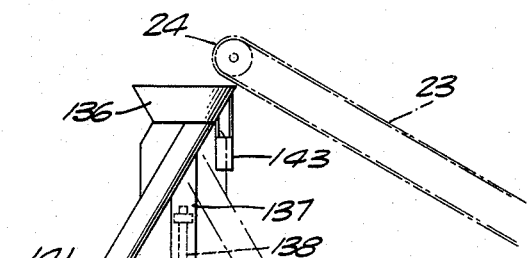
FIG. 4.
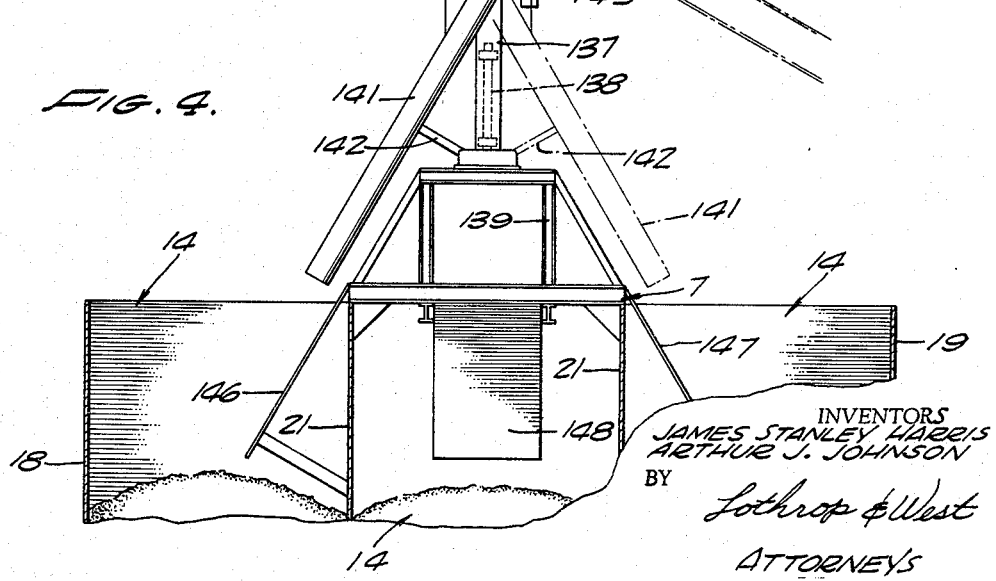
INVENTORS
JAMES STANLEY HARRIS
ARTHUR J. JOHNSON
BY
Lothrop & West
ATTORNEYS

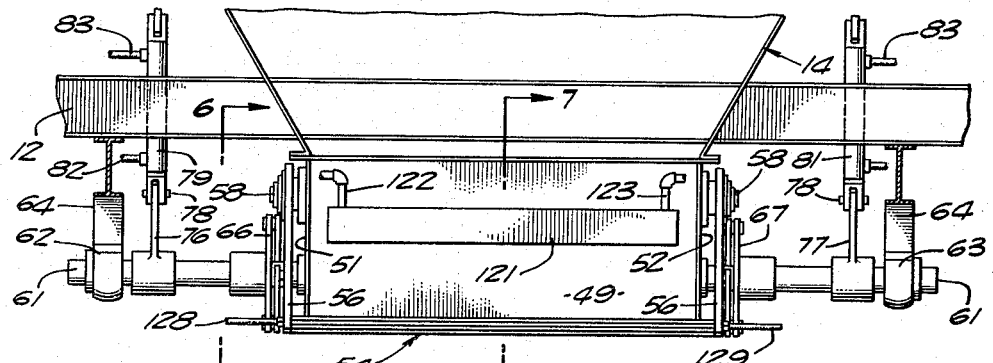
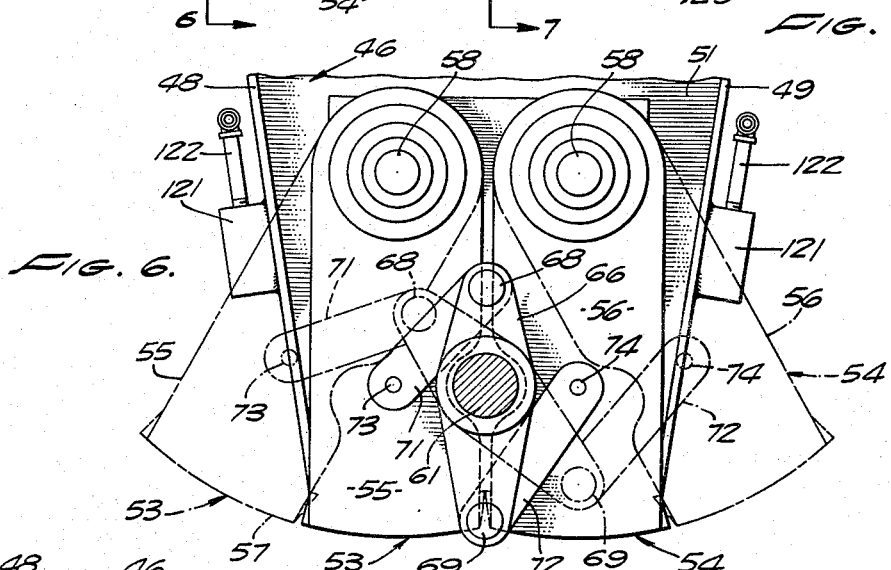
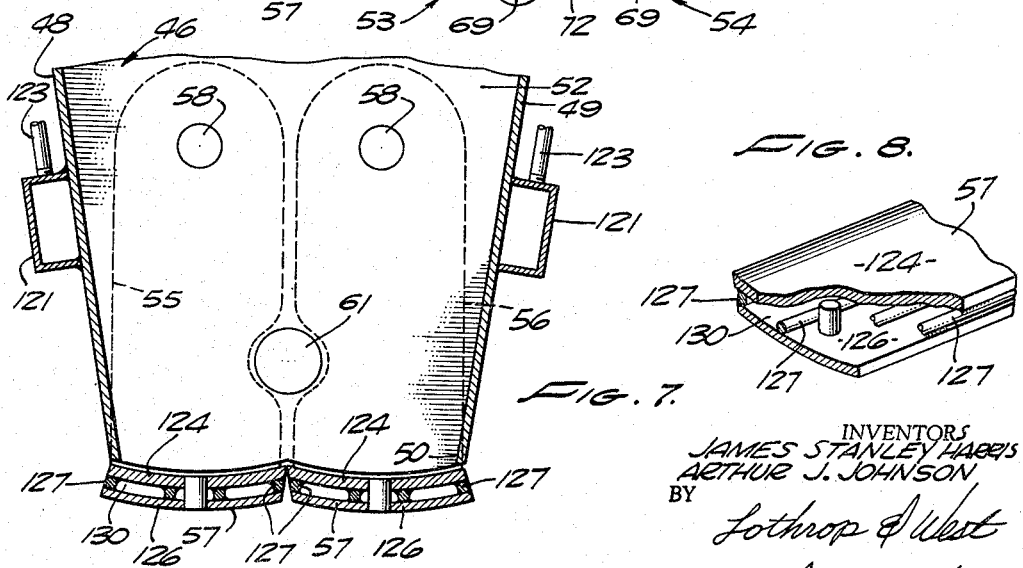

United States Patent Office 3,182,859
Patented May 11, 1965

3,182,859
HOT MIX HANDLING PLANT
James Stanley Harris and Arthur J. Johnson, Sacramento, Calif., assignors to A. Teichert & Son, Inc., a corporation of California
Filed Mar. 22, 1963, Ser. No. 267,205
4 Claims. (Cl. 222—132)

Our invention relates to means especially useful in facilitating the handling of material, particularly paving material, which can with advantage be retained and stored for a protracted period.

In the customary operation of a hot mix plant; that is, a plant in which aggregate such as gravel or crushed rock is mixed with a medium such as asphalt, oil, or the like, and is prepared at an elevated temperature for application to roadways, parking lots and the like before the temperature drops substantially, it has heretofore been customary and necessary to operate the hot mix plant at about the rate at which hauling devices such as trucks could remove the hot mix from the plant for prompt application and use. This has resulted in difficulty in handling relatively large jobs in that occasionally the trucks are not on schedule and the plant must be shut down temporarily and again started up when trucks are again available. Furthermore, the operation of the hot plant has been dependent upon the variable progress of a job which may be some distance away, with consequent time lags. There are other comparable fluctuations in the operation of present plants which are not conducive to a smooth, continuous and economical operation.

It is therefore an object of our invention to provide a hot mix handling plant in which the hot mix can be stored for a protracted period, such as a matter of days, so that the output of the mixing plant and the withdrawal of the hot mix from storage need not be exactly coordinated. In this way it is possible to operate the hot mix plant at a fairly steady and thus economical rate and also to have available peak supplies of hot mix material if necessary or even to retain surplus hot mix material for a relatively long time.

Another object of the invention is to provide a hot mix handling plant capable of storing the customary run of hot mix material.

Another object of the invention is to provide a hot mix handling plant in which the gathering and dissipation of the material are carried on in a smooth, direct, controllable fashion.

Another object of the invention is to provide a hot mix handling plant in which the hot mix is retained in a satisfactory, even an optimum, condition.

Another object of the invention is to provide a hot mix handling plant in which the material is retained at a suitable and safe controlled temperature.

Another object of the invention is in general to improve hot mix handling plants.

Other objects together with the foregoing are attained in the embodiments of the hot mix handling plant described in the accompanying description and illustrated in the accompanying drawings, in which:

FIGURE 3 is a plan of a modified form of hot mix plant similar to that shown in FIGURE 1 but of about half the capacity;

FIGURE 4 is a detailed side elevation showing a part of the construction, the view being taken approximately on the line 4—4 of FIGURE 3;

FIGURE 5 is a detail to an enlarged scale showing in a transverse vertical plane the construction of the lower part of a bin, particularly disclosing the gate arrangement;

FIGURE 6 is a cross section, the plane of which is indicated by the line 6—6 of FIGURE 5;

FIGURE 7 is a cross section, the plane of which is indicated by the line 7—7 of FIGURE 5; and FIGURE 8 is a fragmentary view showing a portion of a heating jacket of one of the gates in isometric projection and with parts broken away.

Figure 1:
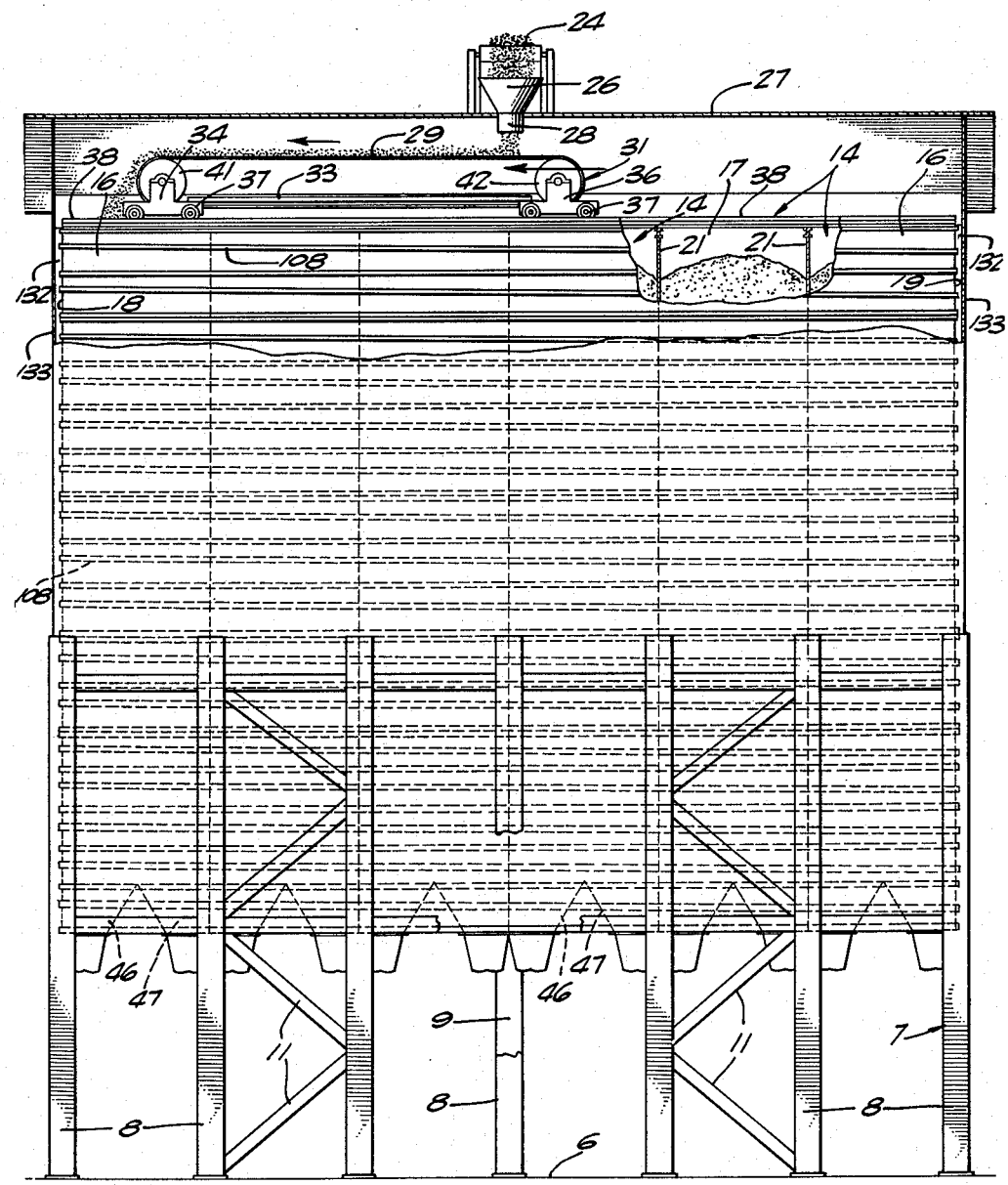
FIGURE 1 is a side elevation of one form of hot mix handling plant pursuant to our invention, certain parts being broken away to show the interior in cross section on various planes.

While the hot mix handling plant pursuant to our invention can be embodied in a number of different ways, it has successfully been embodied substantially as shown herein. In this arrangement there is situated at any convenient location on the ground 6 a suitable framework 7. This is comprised of a number of structural members, particularly uprights 8 and 9 spaced apart at appropriate locations to afford a driveway between them of sufficient width and height to accommodate the customary vehicles, such as auto trucks, utilized for hauling the hot mix away. The framework 7 is provided with appropriate braces 11 and beams 12 to afford effective structural rigidity and to provide bases for the attachment of other parts.

Situated on the framework 7 are bins 14 in any appropriate number. As shown in FIGURE 1, there are six substantially identical bins disposed adjacent each other, whereas in the arrangement shown in FIGURE 3, there are but three such bins arranged side by side.

Each of the bins is comprised of appropriate vertical side walls 16 and 17 and also appropriate end walls 18 and 19, or, in some instances, the bins share a common intermediate wall 21, the walls being of metal. In all instances the bins 14 are generally rectangular in plan and extend from substantially the top of the framework to an intermediate location thereon adjacent the cross beams 12.

To supply the bins with hot mix, there is afforded a conveyor 23 on a suitable supporting framework, not shown. The conveyor comes from a hot mix plant effective to discharge a controlled but preferably substantially continuous supply of hot mix to the upper run of the conveyor 23. The conveyor discharges at its uppermost end 24 into a hopper 26. This is situated centrally of a roof 27 overlying the various bins to keep the elements from entering.

Figure 2:
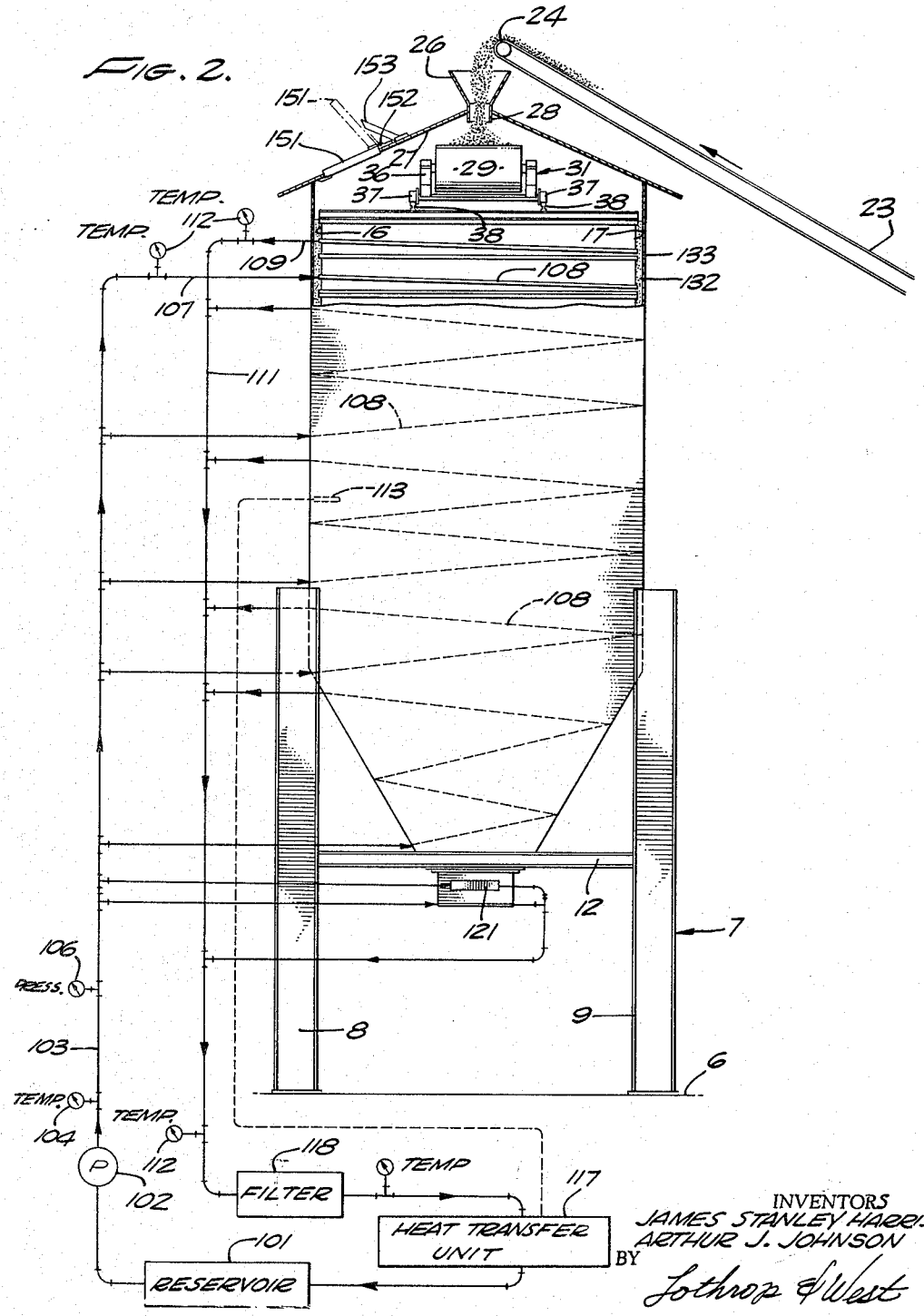
FIGURE 2 is an end elevation of the plant shown in FIGURE 1, portions being broken away to disclose the interior construction and other parts being illustrated diagrammatically.

Beneath the roof there is disposed a central discharge sleeve 28 adapted to direct the mix onto the belt 29 of a distributor mechanism 31. As shown in FIGURES 1 and 2, the distributor mechanism includes a carriage 33 having a framework supported on trucks 34 and 36 at its opposite ends. The trucks have wheels 37 movable along rails 38 spanning all of the various bins 14 and extending from end to end of the framework 7. The trucks 34 and 36 carry pulley drums 41 and 42 around which the belt 29 is trained. Not only is the belt 29 driven in either selected direction by appropriate operation of the pulley drums 41 and 42, but also the carriage 33 can be propelled from the location shown in FIGURE 1 into an opposite location in which the pulley drum 42 is substantially above the right-hand end bin 14. Thus, by appropriately positioning the carriage and by appropriately directing the operation of the belt 29, the influx of material from the discharge spout 28 can be directed to fill any one of the six bins at a time so that they are all supplied as desired. It is, of course, possible to employ but one bin or any number less than the total quantity of bins at any one time, although normally it is preferred to keep a substantially full supply.

To retain or discharge the contents of the bins in accordance with a particular program, each of the bins in its lower portion is bifurcated to afford two converging throats 46 and 47. These are substantially symmetrical and alike so that the description of one applies equally to the others. Particularly as shown in FIGURES 5–8 inclusive, each of the converging throats such as 46 has a pair of inclined side walls 48 and 49. These are preferably of metal and extend downwardly to a narrow rectangular opening 50. Mounted on the end walls 51 and 52 of the throat 46 is a pair of gates 53 and 54. Each of the gates is provided with end supports 55 and 56 and an arcuate bottom closure 57 movable in an arcuate path about supporting pins 58. The pins 58 extend from the end walls 51 and 52 and include antifriction bearings. The gates 53 and 54 swing in paths at least partially coincident with the arcuate bottoms of the end walls 51 and 52, so that when both gates are close together the opening 50 at the bottom of the throat 46 is closed, but when the gates are swung increasing distances apart there is correspondingly free egress from the throat.

To actuate the pair of gates there is provided an operating shaft 61 suspended in journals 62 and 63 carried by brackets 64 secured to the cross beams 12 or other parts of the framework 7. The operating shaft 61 has double crank plates 66 and 67 provided with pivot pins 68 and 69. Links 71 and 72 engaging the pins 68 and 69 are also connected by pivot pins 73 and 74 to the end supports 55 and 56 of the gates. Thus, when the operating shaft 61 is rotated, the gates are simultaneously swung apart or are simultaneously swung together, and when the operating shaft is held still, the gates are also held in a corresponding location.

In order to actuate the operating shaft 61, levers 76 and 77 are provided thereon adjacent each of the brackets 64. Pivot pins 78 join the levers to the lower end of double-acting hydraulic jacks 79 and 81. The jacks are provided with flexible hydraulic conduits 82 and 83 connected in parallel to a suitable hydraulic system, not shown, but effective when appropriately operated positively to open, close or hold the gates. By proper operation of the hydraulic control, the contents of each or all of the various bins 14 can be retained indefinitely or can be individually or collectively discharged at a desired rate.

Particularly pursuant to the invention, there is provided means for maintaining the temperature of the bin contents at a desired value. We have found by extensive experiment, trial and practical operation that it is possible to retain hot mix in the bins for short or long periods with homogeneity, without substantial deterioration, without jamming, and without handling difficulties, providing the temperature is properly maintained. The holding temperature varies in accordance with operating conditions and also in accordance with the particular mix. It is customarily maintained at around 320° F. to 340° F. Oil is utilized as a thermal transfer agent for maintaining the temperature of the various bins and bin contents. If the bin contents are too hot, there is a thermal transfer to the oil for subsequent dissipation, while if the bin contents are too cool, heat previously imparted to the oil is transferred to the mix in the bins.

As particularly illustrated in FIGURE 2, from a reservoir 101 a supply of oil at an appropriate temperature, usually high, is taken by a pump 102 and supplied to a manifold 103. Indicators 104 and 106 show temperature and pressure respectively. The manifold 103 has a number of similar branches. A typical branch 107 extends to a plurality of representative loops 108 in thermal relationship to the conducting walls of the bin 14 in one of the various portions thereof. A typical return branch 109 extends to a return manifold 111. Temperature indicators 112 are placed at different points of interest. A representative thermostat 113 acts through a control line 114 and is responsive to the temperature of the contained hot mix. The thermostat is effective to control the operation of a heat exchanger 117 to which the oil flows from a filter 118 in the manifold 111. The temperature of the oil in circulation is thus responsive to the temperature of the bin contents so that a set or desired temperature can be maintained. The heat exchanger is operated either to add heat to or subtract heat from the circulating oil under the control of the thermostat 113 so that the oil flowing in a closed circuit system establishes and holds the mix temperature within set limits. If desired, various other thermostats and controllers can be provided for governing the temperature and amount or rate of flow of the heat transfer fluid.

It is desirable to maintain the temperature of all parts of the mix handling mechanism, including the temperature of the throats and of the gates. For that reason, each of the metal walls 48 and 49 (FIGURE 6), for example, carries a jacket 121 having an oil supply line 122 and an oil discharge line 123 connected thereto. These lines are joined to the supply and discharge manifolds 103 and 111 respectively so that appropriate temperature is maintained in the throat. Furthermore, the bottoms 57 of the gates are made of double wall construction, particularly as shown in FIGURES 7 and 8. Conveniently, the double walls have an inner plate 124 and an outer plate 126 separated and closed by welded-in bars 127. Oil supply lines 128 extend to one end of the chambers 130 between the plates 124 and 126 from the supply manifold 103, whereas discharge lines 129 extend from the other end of the chambers 130 to the return manifold 111. The lines 128 and 129 are flexible so that the circulation of oil can be maintained even though the gates are moved.

To assist in maintaining the desired temperatures, various thermal insulators are utilized. It is preferred to surround the walls of the bins 14, for example, with an insulating blanket 132 of glass fiber or the like confined and protected by an outer metal wall 133. The insulation 132 is continued around most of the mechanism, including the side walls 48 and 49 of the bins on the outside of the heater jackets 121, although this is not shown in the drawings.

In the modified form of structure shown in FIGURES 3 and 4, the arrangement is substantially the same except for the distributing mechanism. Here there are but three of the bins 14. The discharge from the upper pulley 24 of the conveyor 23 is into a revolving hopper 136 disposed at the upper end of a support tube 137 arranged to revolve on a central shaft 138 upstanding from a superstructure 139 mounted on the upper portion of the frame 7. The hopper 136 not only is freely rotatable around the axis of the shaft 138, but also carries with it a chute 141 extending from the hopper to swing in an arc. The chute 141 is provided with a brace 142 and a counterweight 143, so that the structure is firm and substantially balanced. In the end bins 14 there are deflector plates 146 and 147 so that material falling from the lower end of the chute 141 is directed substantially to the center portion of the bin. The inclination of the deflectors 146 and 147 follows that of the chute 141. The central bin 14 is likewise provided with a deflector 148, but this, as particularly shown in FIGURE 3, is inclined in a direction opposite to the inclination of the chute 141, so as to direct the falling material substantially to the middle of the central bin 14.

In the operation of both forms of the device, the hot mix from the conveyor 23 is discharged into the interior of an insulated enclosure containing bins 14. The material is distributed as desired to any one or all of the various bins and is retained or discharged by operation of the gates. Oil circulating around the bins and within a covering blanket of insulation maintains the temperature of the contents at a desired value.

When it is desired to discharge some or all of the material, the gates at the bottom of each of the throats can be operated hydraulically to fully or partially open position and a vehicle in the driveway beneath the framework is loaded. The gates are then closed and the vehicle advances, giving way to a succeeding vehicle. If desired, the bins can be drawn down very substantially in order to supply an extra large amount of material, or, alternatively, the bins can be loaded over a protracted period in order to afford a substantial reserve. It has been found in practice that when maintained at an appropriate temperature, the content of the bins is ready for use at any time, flows freely and regularly when desired, no lumping or caking of the material occurs, and the intermix of the material is maintained in a homogeneous and satisfactory fashion for use.

Since sometimes the mix may accompany vapors subject to ignition or explosion, a pressure vent is provided. This takes the form of a door 151 of a predetermined weight corresponding to the pressure to be tolerated. The door is connected to the roof 27 by a hinge 152 and has a stop 153 to limit opening movement short of a vertical position. Should there be excessive internal pressure from any cause, particularly gas explosion, the door 151 is forced open until the pressure is relieved, whereupon the door returns by gravity to closed position.

What is claimed is:

1. A hot mix handling plant comprising a framework having a lower portion straddling a driveway, a bin on said framework and overlying said driveway, gates mounted at the bottom of said bin and adapted to be moved to control discharge from said bin to a vehicle disposed in said driveway, means for moving said gates simultaneously, means for supplying hot mix to the upper portion of said bin, heat transfer coils surrounding said bin in thermally conducting relationship therewith, means for circulating heat transfer fluid through said coils, heat transfer jackets on said gates, means including flexible members for circulating heat transfer fluid through said jackets, and means for controlling both of said circulating means in accordance with temperature of hot mix in said bin.

2. A hot mix handling plant comprising a framework, a plurality of physically separate metal bins in thermally contiguous arrangement on said framework, means for supplying hot mix to each of said bins selectively, means for releasing hot mix from the lower portion of said bins selectively, loops for heat transfer fluid encompassing said plurality of bins, means for circulating heat transfer fluid through said loops in accordance with the temperature of hot mix in said bins, and thermal insulation jacketing said bins and said loops.

3. A hot mix handling plant comprising a framework, a plurality of physically separate thermally insulated bins on said framework, means for maintaining said bins at a selected temperature, means for supplying hot mix, means for distributing hot mix from said supplying means to selected ones of said bins, means for releasing hot mix from the lower portion of said bins selectively, said releasing means including movable gates, and means for maintaining said gates at a selected temperature.

4. A hot mix handling plant for hot mix paving material and the like including an aggregate component and an asphaltic or oily component comprising a framework elongated in plan and having a lower portion straddling a driveway extending the length of said framework, a plurality of physically separate and thermally contiguous bins supported on said framework, said bins being arranged beside each other along the length of said driveway, said bins being generally closed except at the top and bottom, a roof overlying and forming a common top closure for all of said bins, said roof having an opening therein, means for supplying hot mix to said bins through said openings, means on said framework beneath said opening for distributing hot mix received through said opening to said bins, means forming bottom closures for each of said bins, said bottom closures including discharge openings and gates movably mounted on said bins for controlling said discharge openings, means looping externally around said plurality of thermally contiguous bins for circulating heat transfer fluid in heat transfer relation therewith, and means for circulating said heat transfer fluid through said movable gates.

References Cited by the Examiner

UNITED STATES PATENTS

| | | | |
|---|---|---|---|
| 2,003,417 | 6/35 | Andreas | 214—17 |
| 2,077,756 | 4/37 | Hurst. | |
| 2,159,689 | 5/39 | Farrell | 222—146 X |
| 2,290,742 | 7/42 | Elze. | |
| 2,439,367 | 4/48 | Middlestadt. | |
| 2,873,037 | 2/59 | Fischer | 214—17.6 |

FOREIGN PATENTS

| | | |
|---|---|---|
| 289,003 | 7/28 | Great Britain. |
| 1,007,699 | 5/57 | Germany. |

LOUIS J. DEMBO, *Primary Examiner.*